United States Patent [19]

Tadros

[11] E Patent Number: Re. 33,014

[45] Reissued Date of Patent: Aug. 8, 1989

[54] CABLE DEPLOYMENT UNIT

[75] Inventor: Atef R. Tadros, Brampton, Canada

[73] Assignee: Sparton of Canada, Ltd., London, Canada

[21] Appl. No.: 272,406

[22] Filed: Nov. 17, 1988

Related U.S. Patent Documents

Reissue of:

[64] Patent No.: 4,727,520
Issued: Feb. 23, 1988
Appl. No.: 1,030
Filed: Jan. 7, 1987

[30] Foreign Application Priority Data

Jan. 8, 1986 [CA] Canada ..... 499,205

[51] Int. Cl.[4] ..... H04B 1/59; B63B 22/18

[52] U.S. Cl. ..... 367/4; 367/3; 441/25

[58] Field of Search ..... 367/3, 4; 188/65.1, 188/65.2; 405/195, 115 G, 199, 115 N, 24, 122.3; 474/171, 178; 114/326, 330, 331, 199; 441/7, 12, 21, 24, 25; 254/300, 301, 318

[56] References Cited

U.S. PATENT DOCUMENTS

| | | | |
|---|---|---|---|
| 2,968,819 | 1/1961 | Jenson | 367/4 X |
| 3,146,754 | 9/1964 | Ohnsman | 114/199 |
| 3,251,024 | 5/1966 | Farmer | 367/4 |
| 3,262,089 | 7/1966 | Proctor et al. | 367/4 |
| 3,309,649 | 3/1967 | Ballard et al. | 367/4 |
| 3,402,687 | 9/1968 | Tsuji | 114/331 |
| 4,093,934 | 6/1978 | Urick et al. | 367/3 |
| 4,143,349 | 3/1979 | Bennett | 367/4 |
| 4,324,193 | 4/1982 | Cutler | 114/199 |
| 4,464,130 | 8/1984 | Ouellete et al. | 441/25 |
| 4,560,029 | 12/1985 | Dalmaso | 188/66.2 X |
| 4,590,590 | 5/1986 | Toone et al. | 441/25 X |

FOREIGN PATENT DOCUMENTS

| | | | |
|---|---|---|---|
| 786481 | 5/1967 | Canada | 340/6 |
| 768433 | 10/1967 | Canada | 114/67 |
| 1002647 | 12/1976 | Canada | 114/46 |
| 1166342 | 5/1984 | Canada | 349/24 |

*Primary Examiner*—Thomas H. Tarcza
*Assistant Examiner*—Tod R. Swann
*Attorney, Agent, or Firm*—Robbins & Laramie

[57] ABSTRACT

In a system for deploying an immersible unit by a cable from a floating platform, the cable deploys freely from a cable deployment unit until a comparator unit, which provides for variable depth control, activates an anchoring-unit. Activating the anchoring unit causes a jacket external to the cable to be tightened about the cable, thereby gradually braking the descent of the cable deployment unit from which the cable is payed out.

5 Claims, 6 Drawing Sheets

CABLE DEPLOYMENT UNIT

Matter enclosed in heavy brackets [ ] appears in the original patent but forms no part of this reissue specification; matter printed in italics indicates the additions made by reissue.

FIELD OF THE INVENTION

This invention relates to cable deployment units in general and to systems for deploying immersible units from a surface platform by means of a descending cable deployment unit in particular. More particularly, this invention relates to a cable deployment unit which allows the cable to deploy normally until a comparator unit activates means to tighten a jacket external to the cable, the friction between the external jacket and the cable causing the gradual braking of the cable deployment unit from which the cable is payed out.

BACKGROUND OF THE INVENTION

When an immersible unit is lowered from a floating platform, by means of a cable deployed from a cable deployment unit, a depth selection and control system is necessary to stop the deployment of the cable, within an acceptable level of accuracy, at the desired underwater depth for the unit. The deployment of a transducer from a sonobuoy is an example of an application wherein an immersible unit must be deployed a certain distance beneath the surface of the water.

Depth selection in present cable deployment units is often limited to several distinct levels, as, for example, a shallow depth of 30 meters, a medium depth of 100 meters, and a deep depth of 300 meters. The selection of depths is fixed because the cable deployment unit can only be deployed fully, partially, or not at all, and can only be deployed partially by using a pretied hanger configuration which is formed permanently during the manufacturing process and which therefore cannot be adjusted to permit a partial deployment of other than constant value.

A further difficulty with present cable deployment units can arise during the lowering of the immersible unit. When the deployment of the cable is suddenly stopped, as, for example, at the fixed medium depth, the cable undergoes severe stress because of the momentum of the descending cable deployment unit. If the stress on the cable is not kept within an acceptable limit, the cable could break at that time.

Yet another difficulty often arises because components of the cable deployment unit can become tangled with the deploying cable, arresting the descent of the cable deployment unit. This is most likely to occur when the cable is displaced from the vertical or when the cable is subject to oscillatory motions.

A system for providing variable depth control for an immersible package has been disclosed in U.S. Pat. No. 4,143,349. The system disclosed therein uses a spring-biased braking arm on top of a coil pack, which is released to pivot against a center post (around which turns of the coil are payed out) in response to a signal generated in the immersible package at the required depth, thereby braking the descent of the immersible package. However, this system depends on the existence of continuous tension in the cable to maintain tightness around the post. In the ocean, wave motion can cause the cable tension to vary, and this can result in repeated cycles of loosening and retightening of the first several turns of cable around the post. This action can create repeated and severe concentrations of stress on the cable, which in turn can cause the cable to break because of fatigue stresses. In addition, the position of the post in the middle of the cable pack might cause the cable to become entangled during the deployment thereof.

SUMMARY OF THE INVENTION

The present invention provides to a cable deployment unit which allows the cable to deploy freely until an anchoring unit is activated and an external jacket is tightened about the cable so as to gradually stop the descent of the cable deployment unit and the deployment of cable therefrom, thereby permitting the selection of any underwater depth (less than the length of the cable) for the cable deployment unit. The stress on the cable is kept within acceptable levels, because the cable deployment unit is gradually braked, and the deploying cable is not prone to entanglement with components of the cable deployment unit.

More particularly, the invention relates to an apparatus for deploying an immersible unit at some selected depth from a surface platform floating in a body of water, comprising: a cable deployment unit from which is payed out a cable, the immersible unit being secured to the cable deployment unit; an anchoring unit above the cable deployment unit and releasably secured to the cable deployment unit by a tie means; a cable engaging means for gradually tightening about the cable, extending between the cable deployment unit and the anchoring unit; means for actuating the anchoring unit at a predetermined depth, the predetermined depth being a function of the selected depth, wherein actuation of the anchoring unit causes the cable engaging means to engage the cable at the anchoring unit and the tie means to be severed, the anchoring unit increasing its distance from the cable deployment unit when the tie means is severed, thereby causing the cable engaging means to engage in increasing frictional contact with the cable along the length of the cable and the cable deployment unit to halt its descent at the selected depth for the immersible unit.

BRIEF DESCRIPTION OF THE DRAWINGS

The present invention will be better understood in describing the preferred embodiment in conjunction with the attached drawings, in which.

DETAILED DESCRIPTION OF THE PREFERRED EMBODIMENTS

Figure 1:
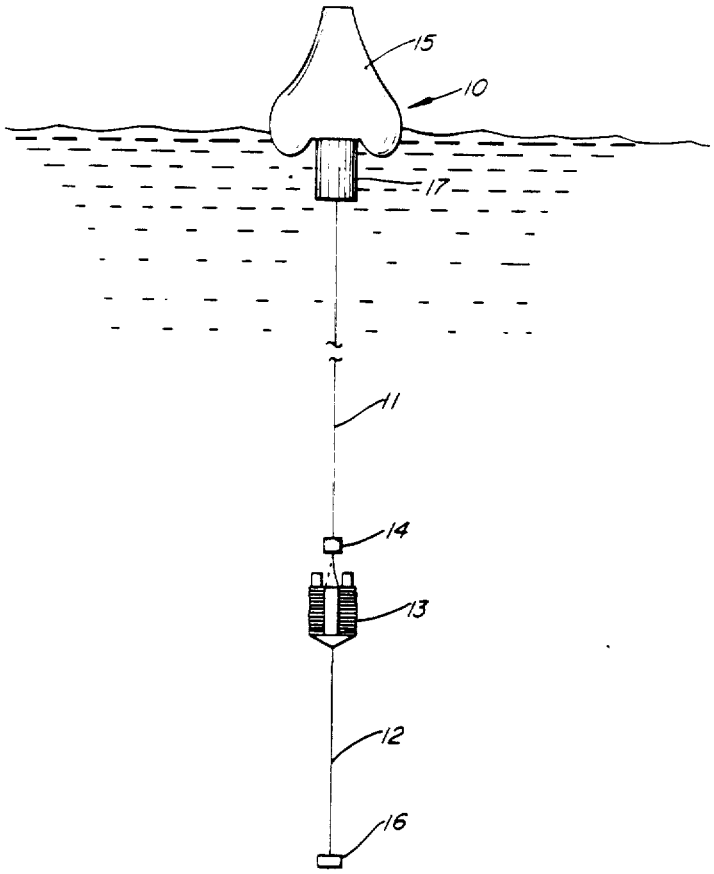
FIG. 1 is a schematic diagram illustrating the manner in which an immersible package is suspended from a cable deployment unit, this unit being deployed from a floating platform by a cable payed out from the cable deployment unit.

FIG. 1 of the drawings shows a floating platform 10, comprising a buoy 15 and fixed thereto a housing 17, deployed in a body of water with a transducer 16 suspended by a fixed cable 12 from a cable deployment unit 13. A cable 11 is payed out from cable deployment unit 13, causing cable deployment unit 13, and thus transducer 16, to descend. As will herewith be described in detail, activation of an anchoring unit 14 effects a braking of cable deployment unit 13 at the desired operational depth for transducer 16. Housing 17 provides protective storage for cable deployment unit 13 and anchoring unit 14 before the descent thereof.

Figure 2:
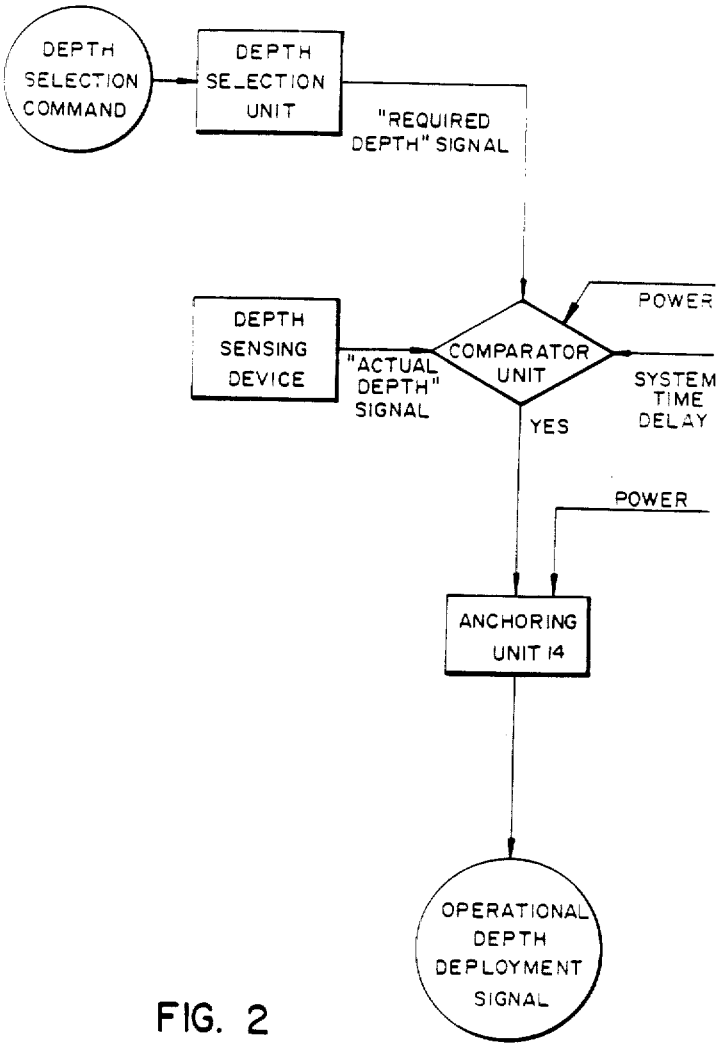
FIG. 2 is an operational chart of a depth selection and control system which is a part of the preferred embodiment.

The functional operation of a depth selection system capable of being used with the present invention is shown in FIG. 2. A selection command for the required operating depth is entered in the depth selection unit by means of a mechanical switch (such as a thumb wheel switch), a coded signal through a direct contact connection, a coded signal through a radio frequency transmission, or any combination of these means. The depth selection unit translates the received depth selection command to an equivalent digital or analog signal for the comparator unit. A depth sensing device provides the comparator unit with a signal corresponding to the actual or estimated depth of transducer 16. This depth sensing device can conveniently be a timer, which provides an estimate of the depth of transducer 16 on the basis of known descent times for cable deployment unit 13; the depth sensing device can also be a counter, which optically counts equally-spaced length marks on cable 11, or a pressure sensor, which determines the actual depth of transducer 16. The comparator unit then provides an output signal to anchoring unit 14. If the signals from the depth selection unit and the depth sensing device are analog voltage signals, the comparator unit can comprise a standard operational amplifier. The output signal of the comparator unit can be made to depend only on the depth command signal and the actual or estimated depth signal, or the comparator unit can also have therein programmed a compensation factor for any necessary time delay involved in the braking mechanism of the system.

When anchoring unit 14 receives the output signal from the comparator unit, the cable braking mechanism herein described will be activated to stop the deployment of cable 11 at the desired operational depth for transducer 16.

Figure 3:
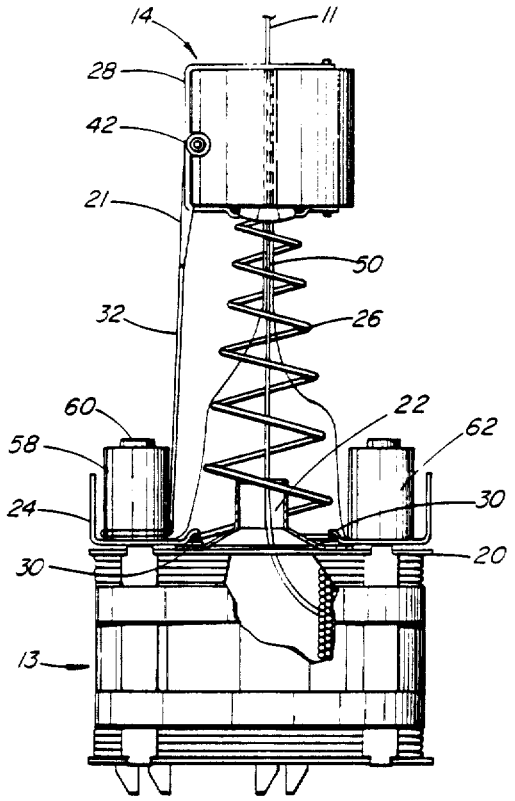
FIG. 3 is a side view of the cable deployment unit and of the anchoring unit shown in FIG. 1, before the anchoring unit is activated, the cable deployment unit being partially broken away to show the coiled cable and the external jacket within the spring.

As shown in FIG. 3, anchoring unit 14 is positioned above cable deployment unit 13. A funnel 22, used to help straighten uncoiling cable 11 out of its pack, is attached to cable deployment unit 13 by clamping the base thereof between a top plate 20 and a base plate 24. A helical spring 26 is used to hold anchoring unit 14 sufficiently far away from cable deployment unit 13 to allow uncoiling cable 11 to straighten before passing through the center of anchoring unit 14. The first (that is, bottom) coil of helical spring 26 is attached to base plate 24 by four preformed clips 30, two of which are herewith depicted. Helical spring 26 can be compressed so that the entire deployment package can be stored in a relatively small space on board the transporting vessel, spring 26 expanding to its operating length only during deployment of the system underwater. A tie 32 is used to stop the expansion of spring 26 beyond the operating length thereof, thereby preventing premature application of the braking mechanism which is to be described. A twin conductor wire 21 extends alongside tie 32 from cable deployment unit 13 and continues to a tie cutter 42 on a clamp holder 28 of anchoring unit 14, conductor wire 21 carrying electrical power to tie cutter 42.

Figure 4:
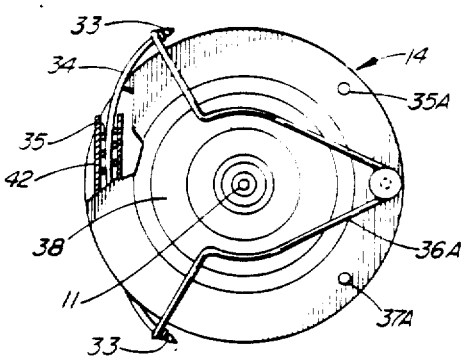
FIG. 4 is a top view of the anchoring unit shown in FIGS. 1 and 3, partially broken away to show a tie cutter.
Figure 5:
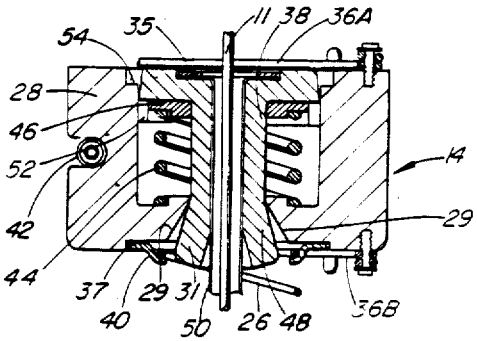
FIG. 5 is a cross-sectional side view of the anchoring unit of FIG. 4.
Figure 6:
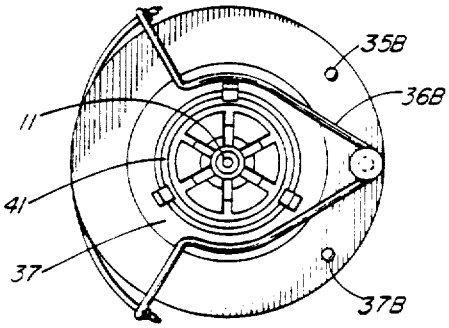
FIG. 6 is a bottom view of the anchoring unit of FIG. 4.

FIGS. 4, 5 and 6 depict anchoring unit 14. A tie portion 34, connected to the ends of wire forms 36 by means of attachments 33, holds under tension the spring action of a wire form 36A at the top of clamp holder 28 and of a wire form 36B at the bottom of clamp holder 28. Wire form 36A is in contact with a clamp flange 38 of a clamp 31, and wire form 36B is in contact with a helical spring top plate 37. Helical spring top plate 37 has attached thereto helical spring 26 by means of four preformed clips 40, two of which are illustrated in FIG. 5. Spring top plate 37 is also located in a recess of clamp holder 28 containing a tapered split portion 48 of clamp 31 which extends through center 41 of plate 37. Clamp 31 has affixed at the upper portion thereof, by means of clips 35, an external jacket 50 which extends through clamp 31 to cable deployment unit 13 and which surrounds cable 11. External jacket 50 is preferably made of a synthetic woven material. A coreless nylon cord having yarn made of a high-tenacity light- and heat-resistant polyamide (prepared from hexamethylenediamine and adipic acid or its derivatives) could be used for external jacket 50. Such a nylon cord would preferably have a minimum melting point of 244° C. for the polyamide material, ends with a denier of 210×4 ply and a spin of 13.5 "S" spin per inch, carriers having one end per carrier and a twist of 9 "Z" twist per inch, 16 carriers per cord with 20 to 22 picks per inch, and a minimum tensile strength of 80 lbs. when wet and 125 lbs. when dry.

Tie cutter 42, upon activation, severs tie portion 34. Tie cutter 42 can comprise a coil of nickel-chromium resistance wire 35 which heats up when current from wire connection 21 passes therethrough and thereby burns through part of tie portion 34. When tie portion 34 separates, wire forms 36 relax outwardly against stops 35 and 37, stops 35 and 37 being positioned on clamp holder 28 so as to ensure that wire forms 36A and 36B, when relaxed, clear, respectively, clamp flange 38 and spring top plate 37. Once wire form 36A clears clamp flange 38, clamp 31 is free to move upwardly under the action of a compression spring 44 on clamp flange 38. A spring seat 46 is used to take up the spring bearing force of spring 44 and thereby transfer the force of spring 44 to clamp flange 38. As clamp 31 moves upwardly, tapered split portion 48 thereof is forced by upwardly sloping walls 29 of clamp holder 28 to tighten clamp 31 around external jacket 50, jacket 50 being pressed into contact with deploying cable 11 along the length of clamp 31. After clamp 31 has moved to its upwardmost position, a flange lip 52 on clamp flange 38 expands outwardly to rest on a groove 54 formed in clamp holder 28, thereby locking clamp 31 in the upper clamping position.

Figure 7:
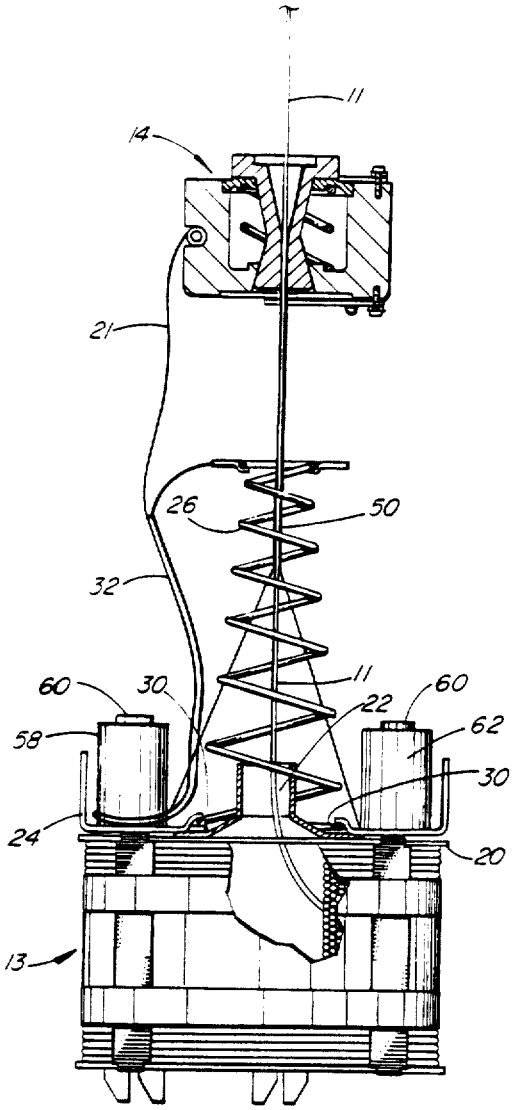
FIG. 7 is a side view of the cable deployment unit and of the anchoring unit shown in FIG. 3, after the anchoring unit has been activated, the cable deployment unit being partially broken away to show the coiled cable and the external jacket within the spring, and the anchoring unit being partially broken away to show the clamping means therein.

As clamp 31 moves upwardly, tapered split portion 48 clears spring top plate 37. Because wire form 36B has cleared top plate 37, top plate 37 is no longer held against clamp holder 28 once tapered split portion 48 is above top plate 37. Anchoring unit 14 is then no longer fixedly secured to cable deployment unit 13, and the frictional contact between jacket 50 and cable 11 causes anchoring unit 14 to move with the motion of cable 11, that is, in an upward direction. This upward motion of anchoring unit 14 causes external jacket 50 to tighten, which reduces the diameter thereof so as to create gradually increasing frictional contact between external jacket 50 and cable 11, thereby causing a gradual braking of cable deployment unit 13. While jacket 50 is being fully extended, the tension from cable 11 is transmitted along the length of contact between cable 11 and jacket 50 (that is, along the length of contact between cable 11 and jacket 50 in clamp 31) to base plate 24. After external jacket 50 has been fully deployed, as illustrated in FIG. 7, cable deployment unit 13 will stop its descent, and no further deployment of cable 11 will take place. Thus, the above braking mechanism enables the deployment of cable 11, and therefore the descent of transducer 16, to be stopped gradually so as not to stress the cable, and allows any depth (less than the combined length of the cable and other components, of course) to be selected by the operator.

As seen from the above description, electric power is required to operate different components of the system. According to the particular application for which the system is used, the required power can be supplied either from a power source on board platform 10 or from a separate battery on cable deployment unit 13. FIG. 7 depicts a possible configuration for the latter arrangement. A set of batteries 58 is mounted on base plate 24 by means of a bracket 60. Batteries 58 supply the required power to activate tie cutter 42, through an electric switch which operates in response to a signal from the comparator unit. The comparator signal is transmitted from the surface unit through cable 11. A circuit board containing the electric switch and the associated circuitry can conveniently be placed in a sealed container 62 which is also mounted on base plate 24. Container 62 can also, if desired, contain the comparator unit and associated circuitry therefor.

Figure 8:
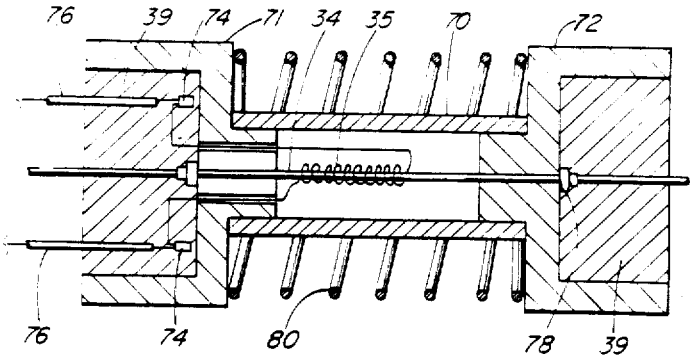
FIG. 8 is a cross-sectional side view of an alternative sealed tie-cutter for use with the anchoring unit.

Because part of the heat generated by a hot-wire type of tie cutter, such as tie cutter 42 in the above embodiment, is dissipated in the ambient fluid when heating occurs underwater, a sealed version of a tie cutter unit can be used to improve the efficiency thereof. Such an alternative sealed tie cutter is depicted in FIG. 8.

In this alternative embodiment of the tie cutter unit, cutter resistance wire 35 is, as before, wrapped around tie portion 34. Cutter resistance wire 35 and tie portion 34 are now located within a plastic tube 70 having two end caps 71 and 72. Each of ends 74 of cutter resistance wire 35 is crimped to a wire 76 from conductor wire 21. Tie portion 34, assembled under tension to overcome the resilient force from a compression spring 80, is held in place by two clamps 78 tightened against each of end caps 71 and 72. Each of caps 71 and 72 can be filled with an epoxy 39 or similar material, in order to seal the connections. The expanding force from compression spring 80 compensates for the hydrostatic pressure force exerted on end caps 71 and 72 when the tie cutter assembly is placed in deep water; the appropriate size and resisting force of compression spring 80 is therefore dependent on the maximum operating depth in which the sealed tie cutter unit is to be used.

The foregoing has shown and described particular embodiments of the invention, and variations thereof will be obvious to one skilled in the art. Accordingly, the embodiments are to be taken as illustrative rather than limitative, and the true scope of the invention is as set out in the appended claims.

I claim:

1. Apparatus for deploying an immersible unit at some selected depth from a surface platform floating in a body of water, comprising:

a cable deployment unit from which is payed out a cable, said immersible unit being secured to said cable deployment unit;

an anchoring unit above said cable deployment unit and releasably secured to said cable deployment unit by a tie means;

a cable engaging means for gradually tightening about said cable, extending between said cable deployment unit and said anchoring unit;

means for actuating said anchoring unit at a predetermined depth, said predetermined depth being a function of said selected depth, wherein actuation of said anchoring unit causes said cable engaging means to engage said cable at said anchoring unit and said tie means to be severed, said anchoring unit increasing its distance from said cable deployment unit when said tie means is severed, thereby causing said cable engaging means to tighten with increasing frictional force about said cable along the length of said cable and said cable deployment unit to halt its descent at said selected depth for said immersible unit.

2. The apparatus of claim 1, wherein said means for activating said anchoring unit at a predetermined depth comprises:

means for selecting an operational depth for said immersible unit;

means for determining an actual depth of said immersible unit;

comparator means for comparing said operational depth and said actual depth and for producing an output signal to actuate said anchoring unit so as to cause said cable deployment unit to halt its descent when said immersible unit is at an actual depth substantially equal to said selected operational depth.

3. The apparatus of claim 1, wherein said cable engaging means comprises an external jacket which tightens about said cable as said anchoring unit increases its distance from said cable deployment unit.

4. The apparatus of claim 3, wherein said anchoring unit comprises clamping means to hold said external jacket in frictional contact with said cable after said anchoring unit has been actuated.

5. The apparatus of claim 1, wherein said tie means are severed by means comprising a coil of nickel-chromium wire which is heated to effect severance of said tie means.

* * * * *